United States Patent [19]

Schaefer

[11] Patent Number: 5,421,621
[45] Date of Patent: Jun. 6, 1995

[54] PACKING MANIFOLD FOR SLIP-TYPE EXPANSION JOINTS

[75] Inventor: David A. Schaefer, Grand Island, N.Y.

[73] Assignee: Adsco Manufacturing Company, Buffalo, N.Y.

[21] Appl. No.: 76,418

[22] Filed: Jun. 14, 1993

[51] Int. Cl.⁶ ............................................. F16L 27/12
[52] U.S. Cl. ..................................... 285/298; 285/11; 285/96; 285/302
[58] Field of Search ................. 285/900, 302, 132, 96, 285/97, 10, 11, 294, 298, 106

[56] References Cited

U.S. PATENT DOCUMENTS

| | | | |
|---|---|---|---|
| 1,994,169 | 3/1935 | Comins | 285/11 |
| 2,308,757 | 1/1943 | Hulsberg | 285/96 X |
| 3,429,588 | 2/1969 | Nelson | 285/96 X |
| 3,984,131 | 10/1976 | Gingrich | 285/302 |
| 4,124,230 | 11/1978 | Ahlstone | 285/381 X |
| 4,146,253 | 3/1979 | Celommi | 285/302 X |
| 4,225,143 | 9/1980 | Hannah | 285/302 X |
| 4,526,409 | 7/1985 | Schaffer | 285/114 |
| 4,856,827 | 8/1989 | Delamane | 285/900 X |
| 5,011,195 | 4/1991 | Nightingale | 285/900 X |

FOREIGN PATENT DOCUMENTS 830127  9/1960 United Kingdom ................. 285/302

Primary Examiner—Eric K. Nicholson
Attorney, Agent, or Firm—Hodgson, Russ, Andrews, Woods & Goodyear

[57] ABSTRACT

A slip-type expansion joint including a body portion for connection to a pipe or conduit and having an inner annular recess for receiving packing rings and injectable packing material and the joint further including a slip portion for connection to another pipe or conduit and guidedly received in the body portion for limited axial movement therein to accommodate limited axial movement of the pipes or conduits, the packing rings providing the main sealing function of the joint and the packing material exerting force on the packing rings to maintain the sealing function thereof, the expansion joint characterized by a plurality of ports around the body in communication with the annular recess for introducing the packing material to the recess and a manifold arrangement extending around the body and connected to the ports for supplying packing material to all of the ports from one location on the manifold arrangement so that packing material can be supplied readily to all of the ports even if some locations around the periphery of the expansion joint are not manually accessible.

7 Claims, 2 Drawing Sheets

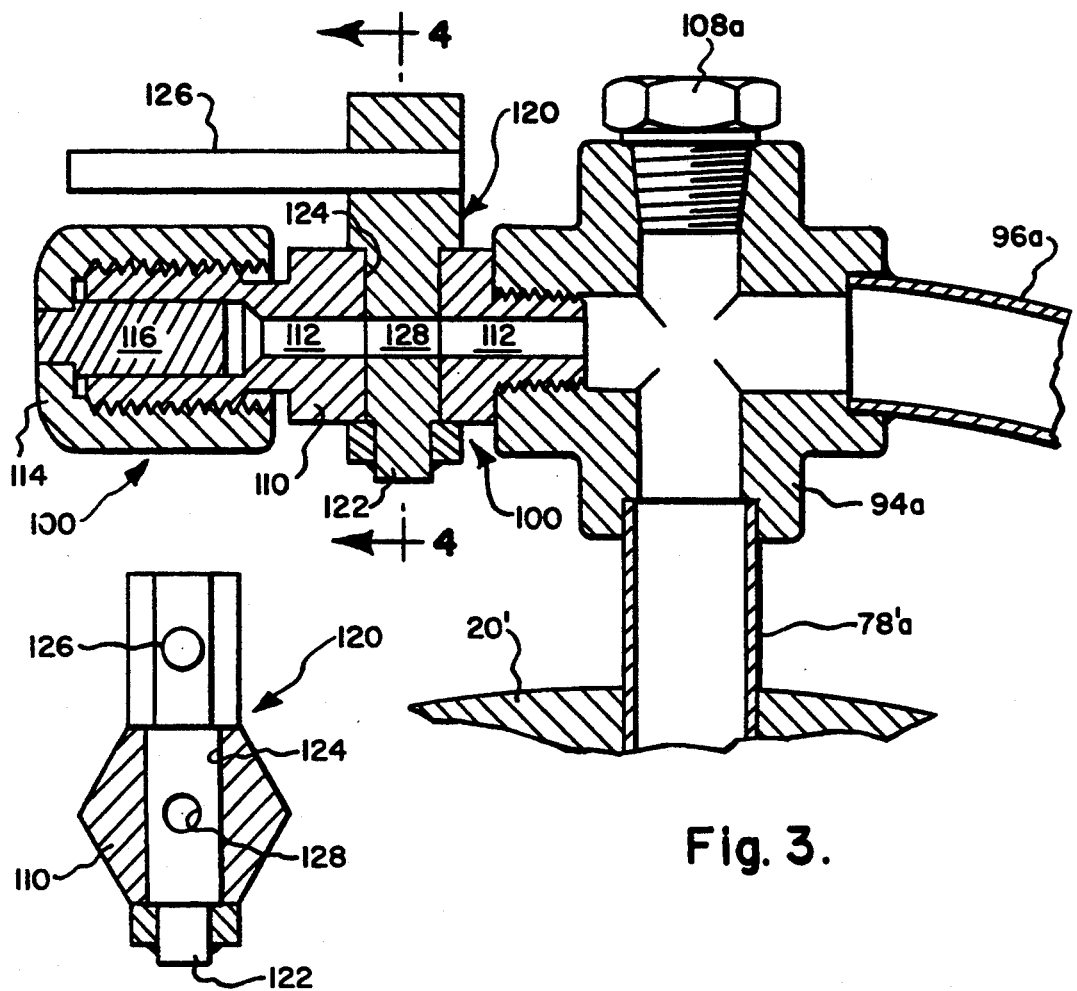
Fig. 3.
Fig. 4.
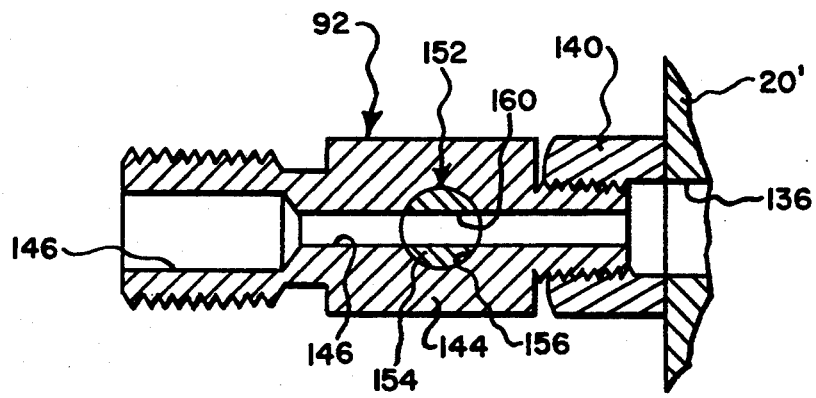
Fig. 5.

PACKING MANIFOLD FOR SLIP-TYPE EXPANSION JOINTS

This invention relates to the art of pipe expansion joints, and more particularly to a new and improved slip-type expansion joint.

Slip-type expansion joints are used to couple the ends of two pipes or conduits containing high pressure stream or similar fluids in a manner accommodating limited axial movement of the two pipes. In a basic slip-type expansion joint, an end of one pipe is fixed via an annular ring to a body portion of the joint which leads to a stuffing box portion provided with a recess to receive packing rings and packing material. An end of another pipe is fixed via an annular ring to a slip portion of the joint which is guidedly received in the stuffing box for limited axial movement therein to accommodate limited axial movement of the pipes.

The packing rings in the stuffing box provide the main sealing function for the joint against leakage of the stream or similar fluid flowing through the pipe. The packing material, which is semi-plastic in nature and is injected into the stuffing box during manufacture of the expansion joint, exerts hydraulic-like squeezing force on the packing rings to maintain the sealing function.

The passage of time between manufacture and installation of the expansion joint, differences in pressure and temperature conditions in the two environments together with the effects of operating conditions of temperature and pressure during use all can result in the need to replenish the packing material at the operating location of the expansion joint. As expansion joints become larger in cross section they require a plurality of packing material injection points around the periphery thereof. A problem can arise, however, when the expansion joint is installed in a building or a tunnel next to a wall or in a corner thereby making some of the injection points inaccessible.

It would, therefore, be highly desirable to provide a slip-type expansion joint wherein packing material can be supplied readily to all injection points regardless of the fact that some locations around the periphery of the joint may not be accessible.

SUMMARY OF THE INVENTION

It is, therefore, a primary object of this invention to provide a new and improved means for supplying packing material to a slip-type expansion joint.

It is a further object of this invention to provide such a supplying means wherein packing material can be provided readily to all injection points regardless of the fact that some locations around the periphery of the expansion joint may not be accessible.

It is a further object of this invention to provide such a packing material supplying means which is simple in construction and efficient and effective in operation.

The present invention provides a slip-type expansion joint including a body portion adapted for connection to a pipe or conduit and having an inner annular recess for receiving packing rings and injectable packing material and the joint further including a slip portion adapted for connection to another pipe or conduit and guidedly received in the body portion for limited axial movement therein to accommodate limited axial movement of the pipes or conduits, the packing rings providing the main sealing function of the joint and the packing material exerting force on the packing rings to maintain the sealing function thereof, the expansion joint characterized by a plurality of ports around the body in communication with the annular recess for introducing the packing material to the recess and manifold means extending around the body and connected to the ports for supplying packing material to all of the ports from a location on the manifold means so that packing material can be supplied readily to all of the ports even if some locations around the periphery of the expansion joint are not manually accessible.

The foregoing and additional advantages and characterizing features of the present invention will become clearly apparent from a reading of the ensuing detailed description together with the included drawing wherein:

BRIEF DESCRIPTION OF THE DRAWING FIGURES

FIG. 3 is an enlarged fragmentary cross-sectional view of one of the shut-off ram assemblies in the expansion joint of FIGS. 1 and 2;

FIG. 4 is a cross-sectional view taken about on line 4—4 in FIG. 3; and

FIG. 5 is an enlarged, fragmentary cross-sectional view taken about in line 5—5 in FIG. 2.

DETAILED DESCRIPTION OF THE ILLUSTRATED EMBODIMENT

Figure 1:
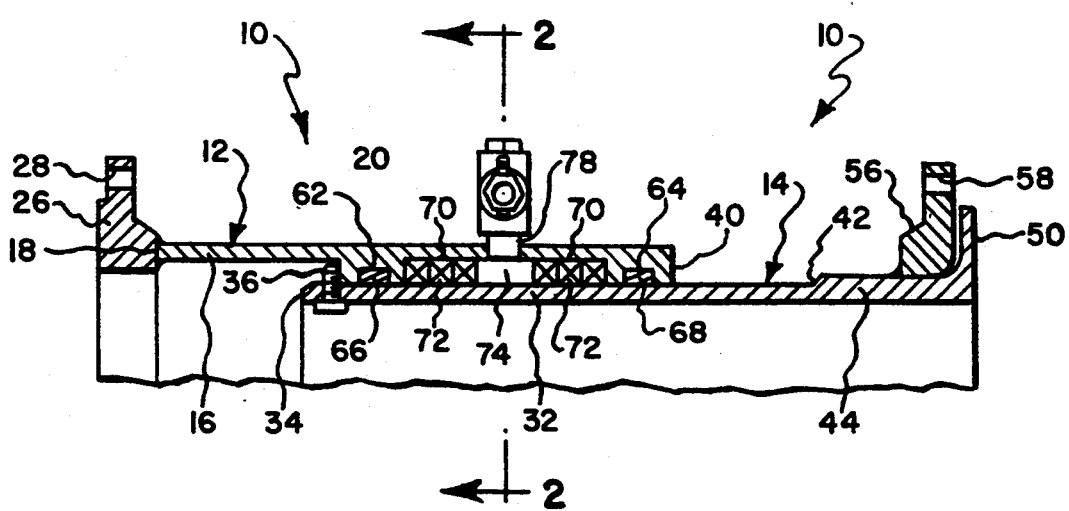
FIG. 1 is a fragmentary longitudinal sectional view of a slip-type expansion joint provided with a packing manifold according to the present invention.

FIG. 1 shows a slip-type expansion joint 10 which includes, basically, a body portion 12 adapted for connection to one pipe or conduit (not shown) and a slip portion 14 adapted for connection to another pipe or conduit (not shown), the slip portion 14 being guidedly received in body portion 12 for limited axial movement therein to accommodate limited axial movement of the pipes or conduits in a known manner. In particular, body portion 12 is substantially cylindrical in overall shape having a main wall portion 16 of constant thickness proceeding axially inwardly from one end 18, which is the left-hand end as viewed in FIG. 1, to a location along the axial length of body 12 where it meets a stuffing box portion 20 of greater wall thickness which extends for the remainder of the axial length of body 12. Stuffing box portion 20 will be described in detail presently. The end 18 of body portion 12 is fixed, such as by welding, to an annular connecting flange 26 which provides a convenient means for connecting body 12 to a pipe or conduit (not shown) which would be provided with a mating connecting flange, securement of the two flanges being provided by bolts or similar fasteners (not shown) extending through aligned apertures provided in the flanges, one being designated 28 in FIG. 1. Body 12 typically is of carbon steel.

Slip portion 14 also is substantially cylindrical in overall shape and has a main wall portion 32 of constant thickness proceeding axially from one end 34, which is the left-hand end in FIG. 1, for a major portion of the axial length of slip 14. The outer diameter of wall portion 32 is slightly less than the inner diameter of stuffing box portion 20 so that slip portion 14 is guidedly received in body portion 12 for limited reciprocal axial movement therein. Axial movement of slip 14 in a direction outwardly relative to body 12, i.e. to the right as viewed in FIG. 1, is limited by engagement between stop means 36 on slip 14 adjacent end 34 thereof and the annular shoulder defined by the junction between wall 16 and stuffing box 20 of body 12. Stop means 36 can be of any suitable form, for example a screw extending through and outwardly of wall 32 as shown in FIG. 1. Axial movement of slip 14 in the opposite direction, i.e. inwardly relative to body 12 which is to the left as viewed in FIG. 1, is limited by engagement between the annular end face 40 of stuffing box 20 and an annular shoulder 42 defined by the junction between main wall portion 32 and a slightly thicker wall portion 44 of slip 14 which extends for the remainder of the axial length thereof. In the expansion joint shown, wall portion 44 of slip 14 terminates in an integral, annular thin-walled flange 50. An annular connecting flange 56, similar to connecting flange 26, is fixed such as by welding to the end of slip 14 and axially adjacent flange 50. Flange 56 would be secured to a mating connecting flange (not shown) on a pipe or conduit (not shown) by bolts or similar fasteners (not shown) extending through aligned apertures provided in the flanges, one being designated 58 in FIG. 1. Slip 14 typically is of carbon steel and plated with chrome.

Stuffing box portion 20 of body 12 is provided with a pair of annular grooves 62 and 64 adjacent the opposite axial ends of portion 12 for receiving guide rings 66 and 68, respectively, which provide close tolerance guiding of slip 14 in body 12. Rings 66,68 are of non-ferrous material, for example bronze, to avoid scratching the plated surface of slip 14. Stuffing box 20 is provided with an annular recess 70 generally centrally axially thereof, i.e. axially between rings 66,68 for receiving packing rings 72 and packing material 74. Packing rings 72 are located in the opposite axial end portions of recess 70 and packing material occupies the remaining volume of recess 70. Packing rings 72 provide the main sealing function between body 12 and slip 14 against leakage of the stream or similar fluid flowing through the pipes coupled by joint 10. Rings 72 can be of various materials such as rubber, synthetic fiber or Teflon. Packing material 74, which is semi-plastic in nature and is injected into recess 70 during manufacture of joint 10 via ports such as that designated 78 in FIG. 1, exerts hydraulic-like squeezing force on packing rings 72 to maintain the sealing function. Expansion joints such as joint 10 described thus far are readily commercially available from Adsco Manufacturing Corp, Buffalo, N.Y. under the commercial designation Adsco Ram-Pak Type Expansion Joints.

For various reasons a need arises to replenish packing material 74 in expansion joint 10 after installation and during use. Such need can be the result of the passage of time between manufacture and installation of joint 10, differences in temperature and pressure conditions between the locations of manufacture and use, and the effects on joint 10 caused by operating conditions of temperature and pressure. As expansion joints become larger in cross section they require a plurality of packing material injection points, such as port 78 in FIG. 1, around the periphery thereof. A problem can arise, however, when the expansion joint is installed in a building or tunnel next to a wall or in a corner thereby making some of the injection points inaccessible.

Figure 2:
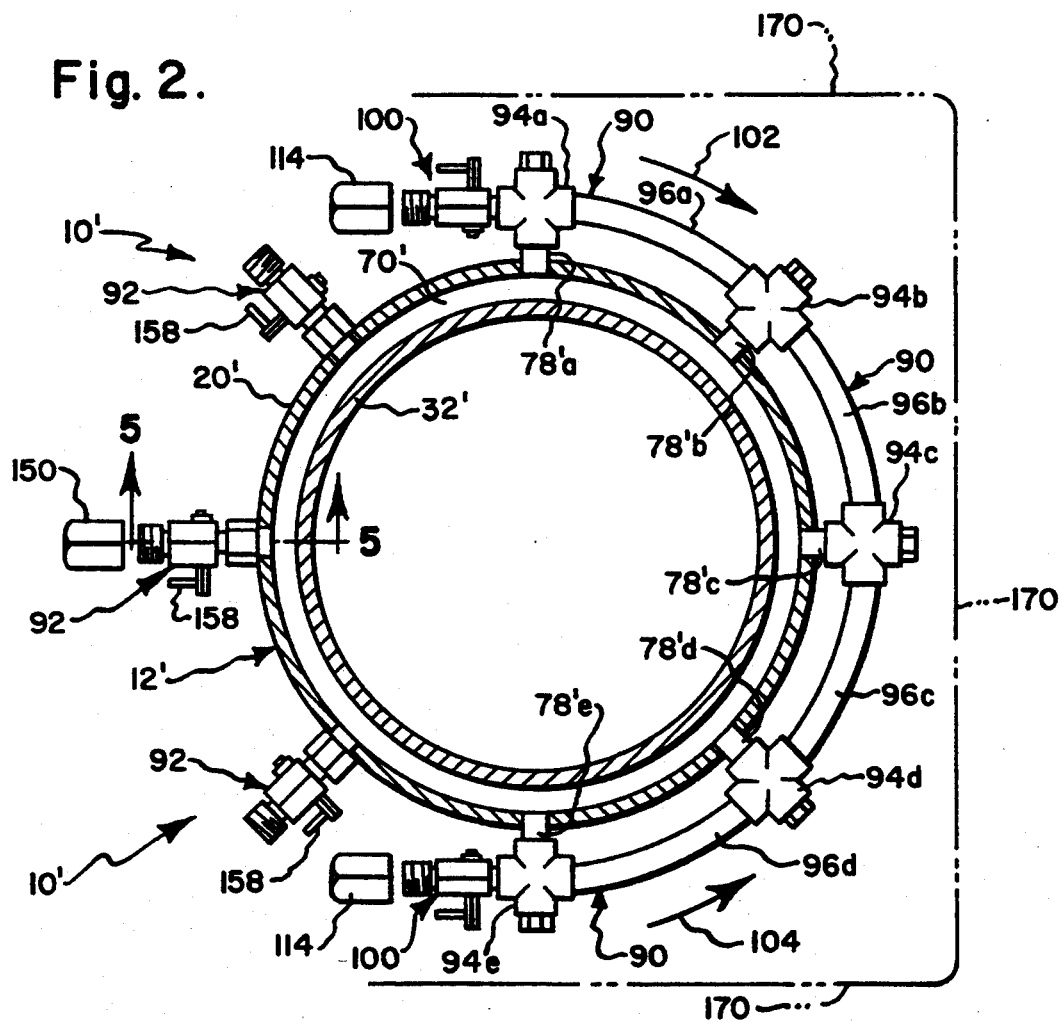
FIG. 2 is a cross-sectional view taken about on line 2—2 in FIG. 1 and showing the entire cross section thereof.

Referring now to FIG. 2, in accordance with the present invention, there is provided an expansion joint generally designated 10' having a plurality of ports 78' around body 12' in communication with annular recess 70' for introducing packing material to recess 70' and manifold means generally designated 90 extending around body 12' and connected to ports 78' for supplying packing material to all of the ports from one location on manifold means 90 so that packing material can be supplied readily to all of the ports 78' even if some locations around the periphery of expansion joint 10' are not manually accessible. In the expansion joint illustrated in FIG. 2, there are five ports 78$a'$, 78'$b$, 78'$c$, 78'$d$ and 78'$e$ which are connected by manifold means 90 which in the illustrated expansion joint extends around one-half the periphery or circumference of the expansion-joint 10'. In addition, joint 10' includes three conventional packing ram-injection port assemblies 92 along the remaining portion of the periphery or circumference which will be described in detail presently, Each of the five injection ports 78'$a$–78'$e$ comprises a relatively short length of pipe or tubing which extends through a corresponding radially directed opening in the wall of stuffing box 20', the inner end of each pipe being in communication with the annular recess 70' and the outer end of each pipe extending slightly beyond the outer surface of body 12'. Manifold means 90 comprises a plurality of fittings 94$a$–94$e$, known in the art as pipe crosses, each one connected to a corresponding one of the ports 78'$a$–78'$e$. The fittings 94$a$–94$e$ are connected together by a plurality of curved pipe or conduit sections 96$a$–96$d$ as shown in FIG. 2. For example, one end of pipe section 96$a$ is connected to fitting 94$a$ and the opposite end of pipe reaction 96$a$ is connected to fitting 94$b$. Pipe sections 96$b$–96$d$ are correspondingly connected to the fittings 94$b$–94$e$. In the expansion joint 10' shown in FIG. 2, packing material is injected at each end of the manifold means 90. To this end there is provided a pair of injection ram assemblies 100, one at each end of manifold means 90, for introducing packing material, the packing directions being indicated by arrows 102 and 104 in FIG. 2.

FIGS. 3 and 4 show in further detail injection port 78'$a$, fitting 94$a$, the end of conduit 96$a$ connected to fitting 94$a$ and ram assembly 100 connected to fitting 94$a$. Fitting 94$a$, which is identical to fittings 94$b$–94$e$, has four openings or ports at 90° intervals as shown in FIG. 3. The tube providing injection port 78'$a$ is fitted into one of the openings, and the one end of conduit section 96$a$ is joined, such as by welding, to the adjacent opening in fitting 94$a$. The third opening in fitting 94$a$ is closed by a plug 108$a$ threaded therein, and the injection ram assembly 100 is connected to the fourth opening in fitting 94$a$.

Ram assembly 100 comprises a substantially cylindrical body 110 provided with a longitudinal passage 112 therethrough. One end of body 110 is threaded into the opening in fitting 94$a$. The opposite end of body 100 is provided with a removable cap 114 threaded thereon which is provided with a central stem 116 received in an enlarged diameter section of passage 112. Ram 100 is provided with a manually-operated valve 120 shown in FIGS. 3 and 4 in the open position. In particular, valve 120 comprises a substantially cylindrical body 122 which is rotatably received in a lateral bore or passage 124 in ram body 110 which intersects passage 112. A handle 126 provides for manual rotation of valve body 122 between the open position shown in FIG. 2 wherein valve passage 128 is in registry with ram passage 112, and a closed position where the passages are out of registry, in a known manner. An identical ram assembly 100 is connected to fitting 94e at the other end of manifold means 90.

As previously described, joint 10' includes three conventional packing ram-injection port assemblies 92 around the remaining portion of the periphery or circumference of joint 10', and one assembly 92 is shown in further detail in FIG. 5. An opening 136 is provided in the wall of stuffing box 20' in communication with recess 70 and a bushing 140 is fixed to the outer wall of body 12, such as by welding, in registry with opening 136. A substantially cylindrical ram body 144 having a longitudinal bore or passage 146 is threaded at one end into bushing 140. The opposite end of body 144 is closed by a cap 150 shown in FIG. 2 removably threaded thereon. A manually operated valve 152 is provided in assembly 92 and comprises a substantially cylindrical body 154 rotatably received in a lateral passage 156 in ram body 144 intersecting ram passage 144 and provided with a handle 158 as shown in FIG. 2. Valve 152 is manually rotated by means of handle 158 between an open position shown in FIG. 5 wherein valve passage 160 is in registry with ram passage 146, and a closed position wherein the passages are out of registry, in a known manner. The three packing ram-injection port assemblies 92 are identical in structure and operation.

In FIG. 2, the broken line 170 represents walls or other like structures which are closely adjacent expansion joint 10' when installed for use. In such an installation some of the locations around the circumference or periphery of expansion joint 10' are not manually or otherwise readily accessible for injection of packing material by methods heretofore available. By virtue of the manifold means 90 according to the present invention, the joint 10' need only be installed in a manner such that the end of the manifold means is accessible for injection of packing material. In the illustrative arrangement of FIG. 2, both ends of manifold means 90 are accessible for injection of packing material.

In operation, when it is necessary to add packing material to expansion joint 10' for the reasons indicated hereinabove, caps 114 are removed from ram assemblies 100 at both ends of manifold means 90, with valves 120 are moved to the closed positions. A charge of packing material is inserted into passage 112, caps 114 are re-installed and valves 120 are moved to the open position. If necessary, the foregoing procedure is repeated for whatever number of times is required. Packing material is introduced to either or both of the ram assemblies 100 in a known manner. The packing material is forced first into fittings 94a and 94e and then along the series of pipe sections 96a–96d to the fittings 94b–94d with the result that packing material is forced through the injection ports 78a'–78e' into the annular recess of the stuffing box to replenish the packing material originally provided during manufacture of the joint. Packing material also is introduced through the manually accessible packing ram-injection port assemblies 92 by removing caps 150, placing valves 152 in the closed position and injecting the packing material into passage 146. Then caps 150 are reinstalled and valves 152 are moved to the open position. When the foregoing is completed, valves 120 and 152 are closed and caps 114 and 150 are replaced thereby sealing against the internal pressures encountered during use of the joint 10.

It is therefore apparent that the present invention accomplishes its intended objects. In the expansion joint 10' of the present invention, packing material can be supplied readily to all injection points regardless of the fact that some locations around the periphery or circumference of the joint may not be accessible. While an embodiment of the present invention has been described in detail, that is for the purpose of illustration, not limitation.

I claim:

1. In a slip-type expansion joint for coupling the ends of two pipes or conduits containing high pressure fluid in a manner accommodating limited axial movement of the pipes or conduits, said joint comprising a body portion adapted for connection to one of the pipes or conduits and having an inner annular recess for receiving packing rings and injectable packing material and said joint further comprising a slip portion adapted for connection to the other pipe or conduit and guidably received in said body portion for limited axial movement therein, said packing rings providing the main sealing function of said joint and said packing material exerting forces on said packing rings to maintain the sealing function thereof:

a) a plurality of ports spaced around said body in communication with said annular recess for introducing and replenishing said packing material to said recess; and b) manifold means extending around at least about half the distance around said body and having a continuous, open and unobstructed interior along the entire length thereof so as to be in free fluid flow communication with all of said ports for supplying packing material to all of said ports from means on at least one end of said manifold means so that packing material can be introduced to said manifold means at said at least one end and supplied through said manifold means readily to all of said ports even if some port locations around the periphery of said expansion joint are not manually accessible.

2. An expansion joint according to claim 1, wherein said body has a longitudinal axis substantially parallel to the longitudinal axes of the pipes or conduits and wherein said annular recess is substantially concentric with said longitudinal axis.

3. An expansion joint according to claim 2, wherein said ports are arranged at spaced locations along a path substantially concentric with said longitudinal axis.

4. An expansion joint according to claim 1, wherein said ports comprise tubes each having a connecting portion located outwardly of said body and a portion extending through said body to said annular recess and wherein said manifold means comprises a corresponding plurality of fittings connected to said tubes and conduit means connected to each of said fittings and having an inlet at one end for receiving said packing material for supply to said ports.

5. An expansion joint according to claim 1, further including a plurality of individual injection assemblies along the remaining distance around said body for injecting packing material to said recess.

6. An expansion joint according to claim 1, further including an injection assembly connected to said at least one end of said manifold means for injecting packing material to said manifold means.

7. An expansion joint according to claim 1, wherein said manifold means has two ends and further including a pair of injection assemblies each connected to a corresponding one of said ends of said manifold means for injecting packing material to said manifold means.

* * * * *